United States Patent [19]

Nemeskeri

[11] 4,451,721
[45] May 29, 1984

[54] METHOD FOR HIGH FREQUENCY WELDING FLANGELESS THERMOPLASTIC SHELLS

[75] Inventor: Georg Nemeskeri, Chester, Canada

[73] Assignee: S. C. Johnson & Son, Inc., Racine, Wis.

[21] Appl. No.: 426,191

[22] Filed: Jul. 26, 1982

Related U.S. Application Data

[63] Continuation of Ser. No. 74,035, Sep. 10, 1979, abandoned.

[51] Int. Cl.³ .............................................. H05B 6/54
[52] U.S. Cl. ............................. 219/10.43; 219/10.53; 219/10.81; 219/10.73; 156/274.4; 156/274.6; 264/26; 264/163
[58] Field of Search ............... 219/10.81, 10.53, 10.41, 219/10.43, 10.73, 10.67; 156/274.4, 274.6, 272.2, 380.6, 380.7, 380.8, 380.2, 380.3, 380.4; 264/25, 26, 27, 163

[56] References Cited

U.S. PATENT DOCUMENTS

| | | | |
|---|---|---|---|
| 2,510,383 | 6/1950 | Dalgleish | 219/10.81 X |
| 2,632,724 | 3/1953 | Lumbard | 219/10.81 X |
| 2,638,963 | 5/1953 | Frederick et al. | 219/10.81 X |
| 2,895,035 | 7/1959 | Peterson et al. | 219/10.81 X |
| 3,617,589 | 11/1971 | Jones-Hinton et al. | 264/27 |
| 3,767,740 | 10/1973 | Jones-Hinton et al. | 264/27 |
| 3,783,156 | 1/1974 | Kuroda | 264/163 X |
| 3,790,420 | 2/1974 | Jenei | 156/273 X |

FOREIGN PATENT DOCUMENTS 1479476  7/1972  Fed. Rep. of Germany .

*Primary Examiner*—B. A. Reynolds
*Assistant Examiner*—Philip H. Leung

[57] ABSTRACT

A method for dielectric welding together of two substantially rigid thermoplastic flanged parts (or "sub-shells") to form a flangeless, typically thin-walled, thermoplastic shell. The method may be praticed using a pair of relatively movable, clamping electrodes, which define a shell-receiving hollowed space bounded by flange-engaging areas, operate together to create a flangeless weld. The characteristics of the dielectric field application, that is, making the dielectric field most concentrated along the line forming the proximal edge of the flanges, the clamping action, and the timing of various operations are all important features of the invention. One of the preferred embodiments utilizes a double-beveled cutting electrode.

6 Claims, 10 Drawing Figures

METHOD FOR HIGH FREQUENCY WELDING FLANGELESS THERMOPLASTIC SHELLS

This is a continuation of application Ser. No. 074,035, filed Sept. 10, 1979 now abandoned.

This invention relates to welding together and cutting out of thin-walled thermoplastic shells. More particularly, the invention relates to a method for dielectric welding and cutting of formed, thermoplastic sheet materials to produce flangeless, thermoplastic shells.

BACKGROUND OF THE INVENTION

There are a wide variety of industries in which welding (sealing) and cutting of thermoplastic materials are required. For example, in the packaging field it is conventional to produce thermoplastic shells by welding together, using dielectric heating, the congruent flanged edges of two thin-walled, thermoformed parts to form a shell. Immediately after such welding, the flanged shell is cut and can be torn away or otherwise removed from the unneeded portions (that is, the portions beginning immediately beyond the sealing flanges) of the sheets in which the parts had been formed.

Such shells are used for a variety of packages, and may be used for toys and many other items. One advantage of such shells, when compared to certain other plastic constructions, is their relatively low cost. The low cost is partially due to the thinness of walls which is possible in thermoforming. The term "thin-walled," as used herein, refers to materials having a wall thickness of from about 0.005 to about 0.050 inches. The invention described herein has particular application to the production of thermoformed shells having wall thicknesses within this range.

The invention relates specifically to a method for dielectric welding. In dielectric welding, as is well known, radio frequency (RF) energy is introduced into the work area in the form of a dielectric field produced by a source of high frequency energy having a magnitude of voltage suitable for the thickness of the particular work load. The types of loads typically encountered possess a loss characteristic which causes a rise in temperature in the work pieces. Heat is generated in the thermoplastic material by the dielectric field, rather than being transferred from hot metal.

In the type of dielectric welding to which this invention is applicable, two thin sheets (which may be called "subshells") of substantially rigid thermoplastic material, one or both of which include portions previously formed (such as by thermoforming) into a desired shape, are sandwiched under at least moderate pressure between a pair of relatively moveable metallic electrodes to form a capacitance. A radio frequency high-power oscillator is utilized to apply high frequency energy across the capacitance during a predetermined interval. The heat which is generated throughout the thermoplastic material causes the temperature at the interface of the sandwiched parts to rise to the melting point of the plastic material, causing fusing of the two sheets to take place.

In the prior art, the two electrodes between which the thermoplastic parts are sandwiched are shaped to produce an RF seal in a flange around the edge of the shell being produced. The electrodes typically include shell-receiving hollowed spaces bounded by flange-engaging portions. The flange-engaging portions typically have flat (or, in some cases, inwardly beveled) flange-engaging surfaces immediately adjacent to the shell-receiving hollowed spaces. The flange-engaging surface of one of the electrodes usually terminates radially outwardly in a cutting edge protruding toward the other electrode. This electrode configuration allows welding in the flange area and subsequent cutting beyond the flange area to free the welded, thermoformed shell from the stock of which it was made.

While such electrode configurations and methods are quite typical of the prior art, variations have been made in electrode configurations and in the methods used for RF welding and cutting of thin-walled parts to produce thermoformed shells. And, various improvements in such shells have resulted. However, such thin-walled, welded thermoformed shells have had certain disadvantages or drawbacks when compared to much heavier and/or more expensive plastic containers or shells, such as those made by blow-molding, injection molding, spin-welding, ultrasonic welding or other methods.

Unlike containers or shells made by these other methods, thin-walled, substantially rigid, thermoformed, welded shells of the prior art have required an integral sealing flange which surrounds the shell. While such flanges can occasionally be used to some advantage and do not always detract from desirable aesthetic qualities of a thermoformed shell, they nevertheless severely restrict design freedom in the field of thermoformed shells and thus restrict the commercial usefulness of thermoformed shells.

Furthermore, the presence of integral flanges increases the amount of wasted plastic sheet stock and necessitates substantial spacing between shells when a multiplicity of shells are formed in the webs.

The prior art discloses methods for butt-welding (joining parts together without a flange, in edge-to-edge contact) of relatively heavy gauge plastic materials, including methods for forming flangeless plastic shells by RF welding. The need for a flange to hold the parts together is eliminated in such methods by complicated and expensive procedures which are impossible or impractical for use in making thin-walled shells. Such procedures include such steps as pre-forming a groove or other space along at least one of the edges to be joined together, such groove or space being designed to receive molten plastic during the welding process and thus serve to hold the parts together in an edge-to-edge relationship. Such prior methods do not address the problem of welding together thin-walled, thermoformed subshells, and do not provide certain important advantages of this invention.

BRIEF SUMMARY OF THE INVENTION

The present invention provides a novel method for welding together two substantially rigid thermoplastic parts of the type having flanges with congruent proximal edges to form a flangeless thermoplastic shell. Unlike the prior art, the instant invention provides a butt-welding method which is usable on inexpensive, thin-walled, thermoformed subshells.

The method of this invention may be practiced on existing radio frequency welding equipment which is modified, however, as required by this invention. The method includes the steps of clamping two formed, thermoplastic subshells together through their flanges between a pair of facing electrodes such that the congruent proximal flange edges of the subshells are aligned. While the application of pressure continues, a dielectric field is applied to the flanges, the field being most concentrated at the aforementioned proximal edges, to soften and fuse the flanges together at and near the proximal edges. A continuation of clamping pressure displaces some softened flange material to form a bead at a location inside the proximal edge location and inside the wall of the thermoplastic shell. The application of the dielectric field is discontinued and, immediately thereafter, the resultant flangeless shell is severed from (or weakened with respect to) the flanges at the proximal edge location by further clamping movement of the electrodes which moves the flange material outwardly while it is still in softened condition.

The apparatus used in practicing this inventive method includes a pair of facing electrodes which are relatively movable, toward and away from each other, along an axial center line and which together define a shell-receiving hollowed space bounded by flange-engaging clamp areas. A characterizing feature of the device is that one of the electrodes is a cutting electrode the clamp area of which terminates radially inwardly (that is, immediately adjacent to the shell-receiving hollowed space) in a cutting edge which is congruent to the proximal flange edges of the thermoplastic subshells to be welded together. The other of the facing electrodes is an anvil electrode the clamp area of which terminates radially inwardly in an inner anvil edge congruent to and axially aligned with the cutting edge. The apparatus includes the normal means for applying clamping pressure to the flanges through the electrodes, suitable devices for applying a dielectric field to the flanges through the electrodes, the mechanical arrangements to apply cutting pressure to the flanges between the cutting edge and the anvil during and/or after application of the dielectric field has ended.

The cutting electrode clamp area is beveled radially outwardly (away from the shell-receiving hollowed space) from the cutting edge such that axial spacing (in a direction parallel to the relative movement of the facing electrodes) between the clamp areas of the two electrodes increases as the radial distance from the cutting edge increases. In a preferred apparatus, the bevel of the cutting electrode has two single-curved surfaces ("single-curved surface," as used herein, refers to a surface which may be generated by a straight line moving in contact with a curve), including a first bevel surface immediately adjacent to the cutting edge and a second bevel surface beyond the first surface, the second surface being beveled at a smaller angle to the direction of relative electrode movement.

The double-beveled configuration allows the proper degree of radially inward displacement of softened flange material to form a bead inside the proximal edge location, while allowing proper removal of unneeded softened material. The first bevel surface, by being close to horizontal, pushes enough softened material inwardly to form the bead. The second bevel surface, by being at a smaller angle to the axis of movement, provides space for and encourages outward movement of softened flange material, away from the shell.

OBJECTS OF THE INVENTION

It is an object of this invention to provide a method for welding together of thermoplastic parts which overcome the aforementioned problems of the prior art.

Another object of this invention is to provide a method for welding of thin-walled, thermoplastic parts which produce flangeless shells.

Another object of this invention is to provide butt-welded thermoformed shells, particularly of thin-walled construction.

Still another object of this invention is to provide versatility in thermoformed plastic shell design and greater utility for thermoplastic shells.

Another object of this invention is to provide a method for dielectric welding of thermoformed shells which reduces waste of plastic material.

These and other important objects of the invention will become apparent from the following descriptions and from the drawings of preferred embodiments wherein:

DESCRIPTION OF PREFERRED EMBODIMENTS

Figure 1:
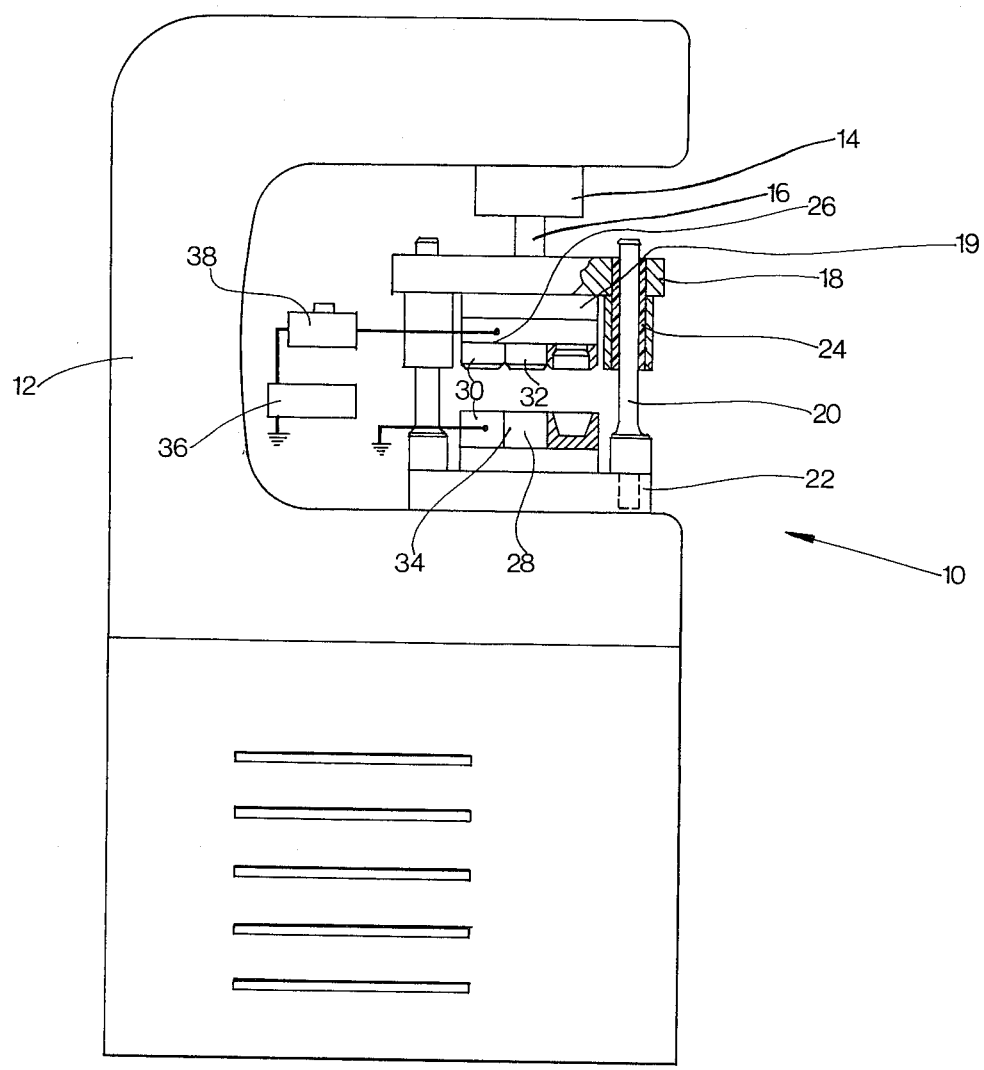
FIG. 1 is a side elevation of a dielectric welding press for practicing the method of this invention.

FIG. 1 illustrates a dielectric welding press 10 which includes one or two conventional spaced vertical frame members each having a C-shaped portion 12 at the upper end thereof. Double-acting fluid work cylinder 14 is secured to the upper C-arm with work shaft 16 extending downward from cylinder 14 and secured to its lower end to a movable platen 18. Posts 20 are connected to the lower C-arm and to a fixed platen 22 and extend upwardly to be slidably received within movable platen 18. This structure, which is well known to those skilled in the art, stabilizes vertical motion of movable platen 18 as work shaft 16 is operated.

Depending from the lower surface of movable platen 18 is an insulating platen 19 and an electrode structure 26, which are movable with movable platen 18. A fixed electrode structure 28, which faces movable electrode structure 26, is mounted to fixed platen 22. Insulators 24, mounted within movable platen 18, electrically separate posts 20 from movable platen 18, and these serve to further insure electrical separation of movable platen 18 and movable electrode structure 26 from fixed platen 22 and fixed electrode structure 28.

Figure 3:
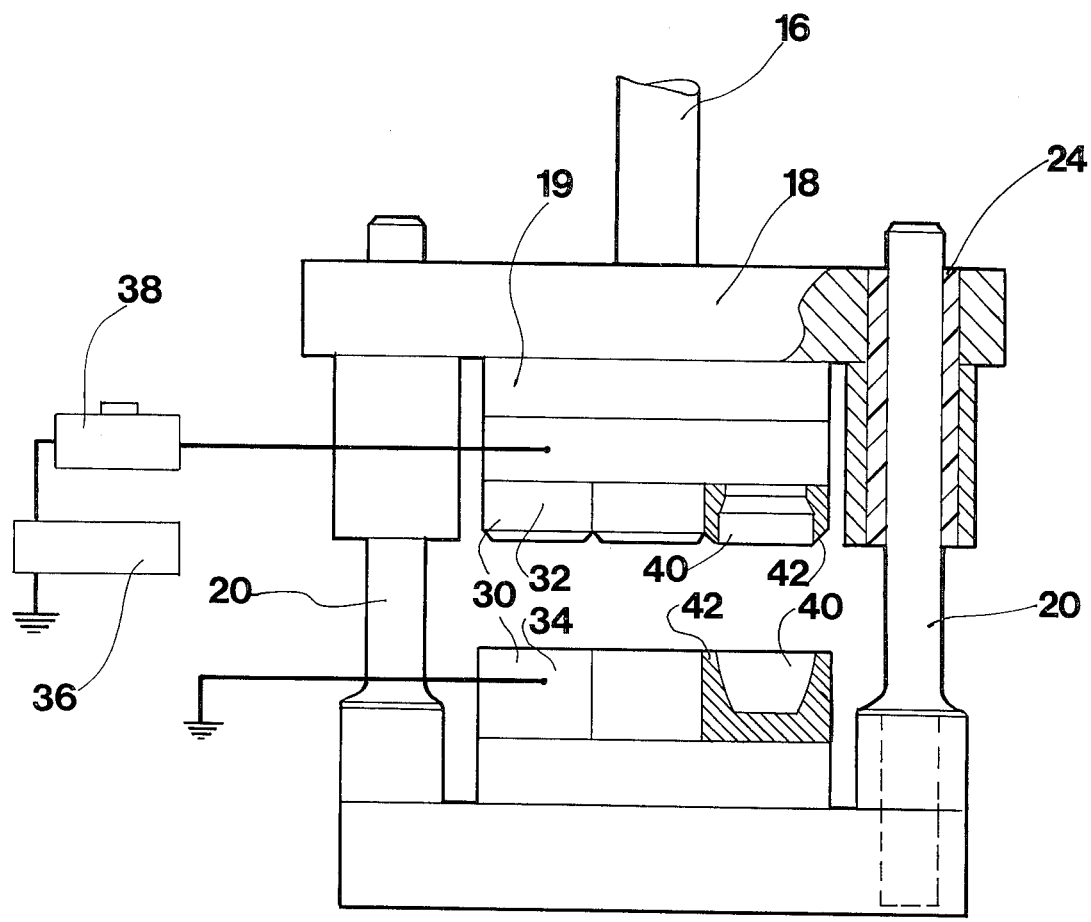
FIG. 3 is an enlarged, partially sectional view of a portion of FIG. 1.

Three separate electrode sets 30 are formed in electrode structures 26 and 28. Electrode sets 30, one of which is illustrated in cross-section in FIG. 1, are identical one to another in all respects. Each set includes a movable electrode 32 and a fixed (or "anvil") electrode 34. The electrode structures are better illustrated in the enlarged views of FIGS. 3 and 4. Periodically, during operation, RF energy is applied to movable electrodes 32 by an electronic RF source 36 through control switch 38, both of which are schematically illustrated in FIG. 1, in a manner well known in the art.

The facing electrodes 32 and 34 are relatively movable, toward and away from each other, along an axial center line which is parallel to posts 20 and work shaft 16. Such an axial line and the corresponding radial directions are referred to herein to assist in describing various elements, their location, and orientation. Electrodes 32 and 34 together define a shell-receiving hollowed space 40 bounded by flange-engaging clamp areas 42, the characteristics of which are an important part of this invention. The profile of either electrode does not change at any point around the edge thereof.

Electrode 32 is a cutting electrode the clamp area of which terminates radially inwardly (that is, immediately adjacent to the shell-receiving hollowed space) in a cutting edge 44. Cutting edge 44, which is preferably polished to insure its cutting accuracy, is congruent to the proximal flange edge of the thermoplastic subshell it contacts in the welding operation, as will be described later in greater detail. The clamp area of fixed electrode 34, which faces cutting electrode 32, terminates radially inwardly in an inner anvil edge 54 which is substantially congruent to and axially aligned with cutting edge 44. Formed in cutting electrode 32 is a bevel 60 such that it is beveled radially outwardly from cutting edge 44. The clamp area of fixed electrodes 34, on the other hand, is a normal surface 62 which is substantially perpendicular to the axis line. Thus, cutting electrode 32 and anvil electrode 34 are such that the axial spacing between bevel 60 and normal surface 62 increases as the radial distance from cutting edge 44 increases.

While a beveled surface on the cutting electrode and a normal surface on the anvil electrode are preferred, both electrodes can be beveled to some extent, as long as the axial distance between the two electrodes increases as the radial distance from the cutting edge increases. In some embodiments, the profiles of the two facing electrodes could be substantial mirror images, in which case labeling the electrodes "cutting" or "anvil" electrodes could be considered a matter of choice. Furthermore, it is not of significance to this invention which of the two electrodes is movable and which is fixed. Indeed, both electrodes could be made movable, it being important only that the two electrodes be relatively movable.

Figure 4:
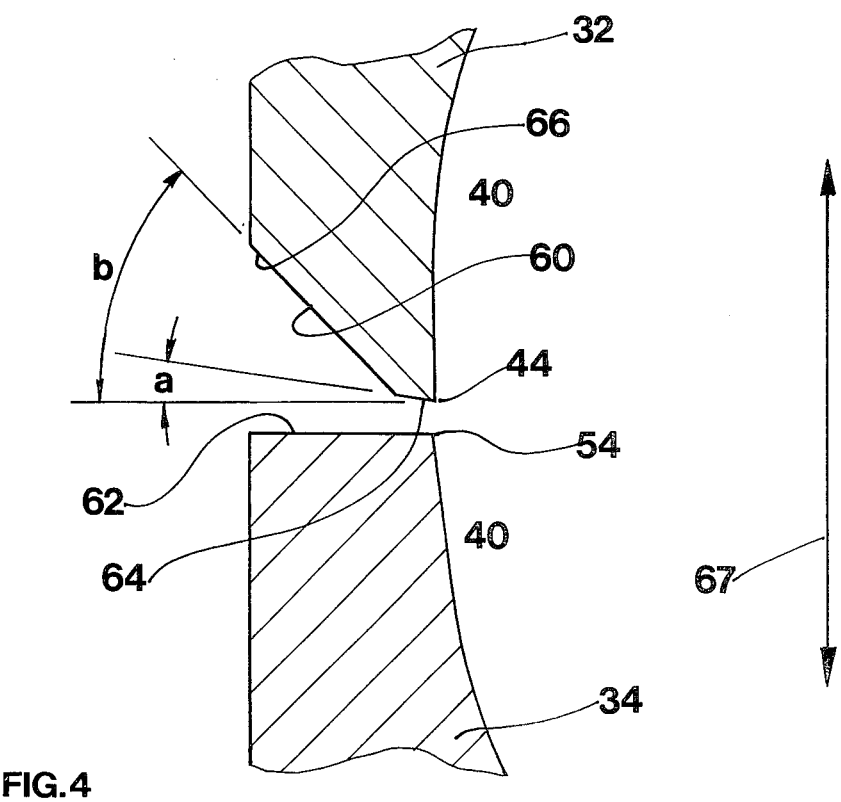
FIG. 4 is an enlarged sectional view of a portion of FIGS. 1 and 3, showing preferred dielectric welding electrodes for practicing the method of this invention.

FIG. 4 illustrates in greater detail a particularly preferred double-beveled cutting electrode clamp area having a first bevel surface 64 immediately adjacent to cutting edge 44 and a second bevel surface 66 just beyond first bevel surface 64. Second bevel surface 66 is beveled at a smaller angle to the axis line (identified by numberal 67) than is first bevel surface 64. That is, the complement of angle b is smaller than the complement of angle a. The purposes and functions of the two bevels were set forth above.

The precise shapes (profiles) of the cutting electrode and anvil electrode, including the bevel angle(s) chosen and the electrode width or partial width (such as the width of first bevel 64 in FIG. 4), will be dependent upon several variables including: (1) the materials to be welded; (2) the thickness of the materials to be welded, (3) the temperature of the materials prior to and during welding; (4) the electrode temperatures; (5) the press power available; (6) the RF power available; and (7) the desired size and strength of the weld. Adjustment of various factors can alter the optimum profile design. Acceptable electrode designs, machine set-ups, and the like would be apparent to those skilled in the art who are familiar with this invention.

Normal surface 62 and bevel surfaces 64 and 66 of the electrodes are each substantially single-curved surfaces. Thus, they are represented by straight lines in the cross-sectional view of FIG. 4. Certain minor curvatures which would change the electrode profile (FIG. 4) to some extent could be designed into the electrodes without an adverse effect upon operations. The electrode profiles, whether straight or curved and whether single-beveled or double-beveled, should be kept uniform to insure an even flangeless weld.

Figure 2:
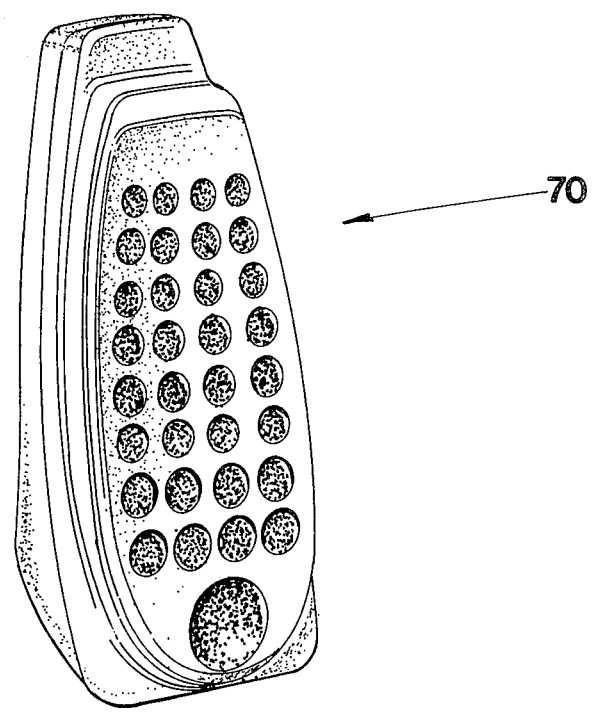
FIG. 2 is a perspective view of a flangeless plastic package made in accordance with this invention.
Figure 5:
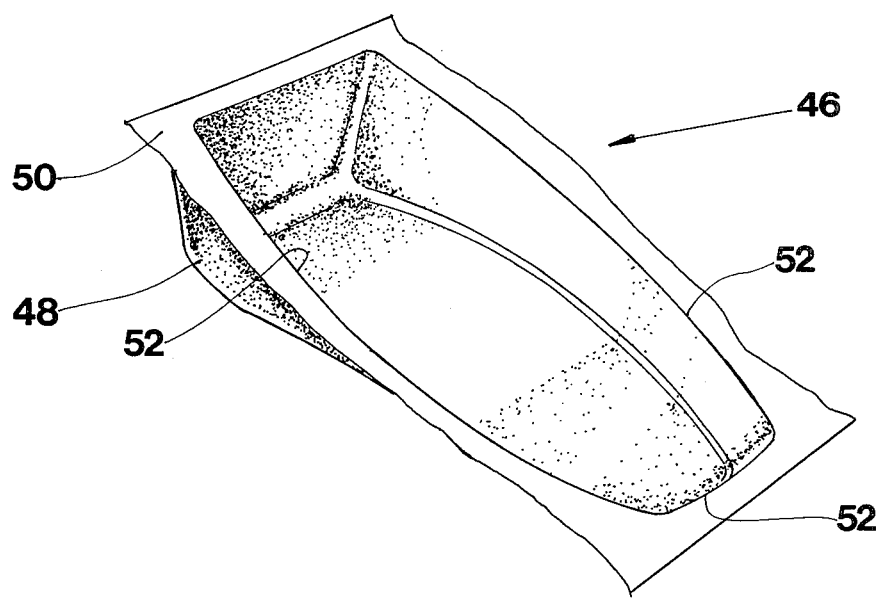
FIG. 5 is a perspective view of a plastic subshell to be welded (to another subshell) by method of this invention.

FIG. 5 illustrates a plastic subshell 46 including a formed portion 48 and a flange portion 50. Flange 50 joins formed portion 48 at the proximal flange edge 52. Another subshell (not shown in FIG. 5) having a flange with a proximal flange edge congruent to edge 52 is welded to subshell 46 using the method of this invention to form a flangeless shell, such as flangeless shell 70 shown in FIG. 2.

The two subshells may have formed portions which are mirror images of one another or may be completely different, as may be determined by the product designer. In some cases, only one of the subshells may have a formed portion, the other consisting simply of unformed sheet stock. In such cases, for purposes of describing and claiming this invention the "proximal flange edge" line may be considered to be whereever the sheet stock contacts the proximal flange edge of the other subshell. Cutting edge 44 and anvil edge 54 are congruent to the pxoximal flange edges of the subshells to be welded together.

While in some cases the subshells will be preformed well before the welding operation, in other cases one or both of the subshells may be formed with a welding die which is modified to serve as a forming and welding die, with related equipment being modified accordingly. For example, in one situation one subshell is brought to the welding equipment pre-formed while the other subshell is formed by a welding die which includes apparatus for vacuum-forming or pressure-forming to occur during or just before the welding portion of the cycle.

Figure 6:
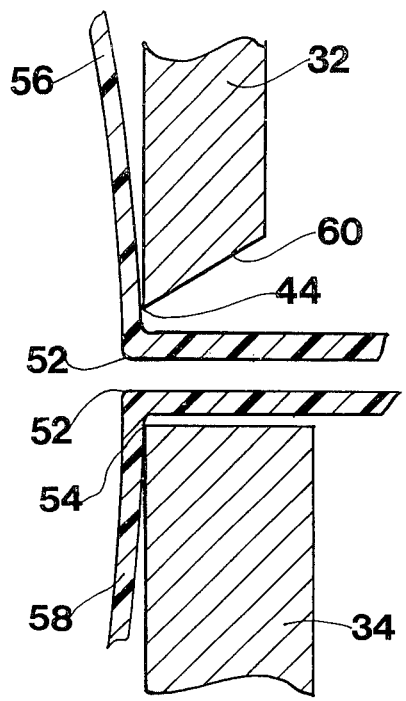
FIGS. 6–10 are sectional views of dielectric welding electrodes useful for this invention, illustrating several steps in the welding method.
Figure 7:
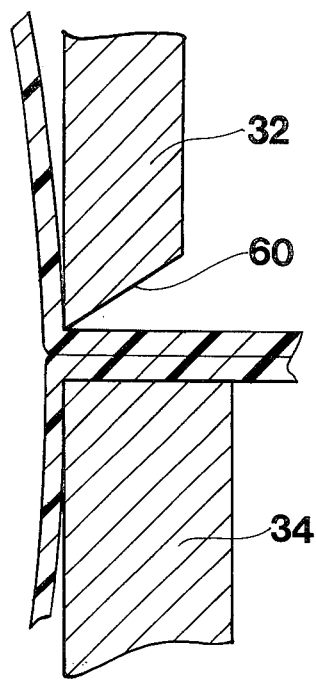

The action of movable electrode 32 and fixed electrode 34 on the two subshells is illustrated best by FIGS. 6-10. FIG. 6 illustrates first subshell 56 and second subshell 58 in axial alignment with electrodes 32 and 34 preparatory to the welding operation. Cutting edge 44, inner anvil edge 54, and the congruent proximal flange edges 52 of subshells 56 and 58 are all in axial alignment. FIG. 7 illustrates a sandwiching action of electrodes 32 and 34 on subshells 56 and 58 as work cylinder 14 operates to move electrode 32 toward fixed electrode 34.

When the sandwiching condition of FIG. 7 is achieved, a dielectric field is applied to the flanges between movable electrode 32 and fixed electrode 34, which is grounded. By virtue of the aforementioned axial spacing of the electrode clamp areas, which increases at positions progressively farther removed in a radial direction from cutting edge 44, the dielectric field is most concentrated at proximal edges 52 and progressively weaker at positions farther out. This condition is important to achieving a satisfactory flangeless weld. During this period of RF field application, clamping pressure is continuously exerted on the subshell flanges through the electrodes, by means of the action of work cylinder 14.

Figure 8:
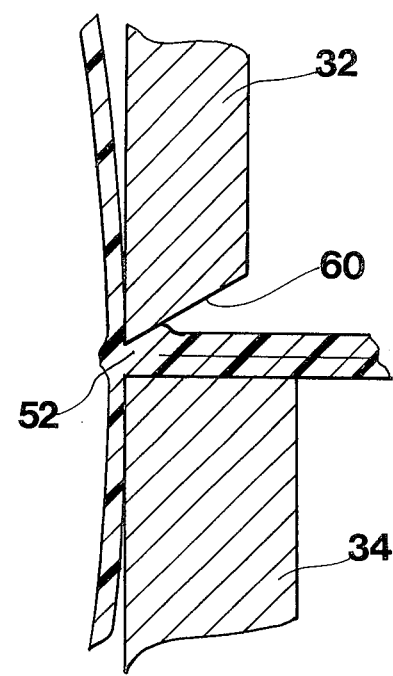

FIG. 8 illustrates the relative positions of the electrodes 32 and 34 and the condition of subshells 56 and 58 approximately midway through the period of dielectric field application. FIG. 8 shows that softening and lateral movement of flange material in both radial directions is in progress. The variable concentration and resultant variable softening effect of the dielectric field tend to control the lateral movement of softened plastic material. The greater the angle of bevel 60 in movable electrode 32 to a plane perpendicular to the axis of relative movement (or, stated differently, the smaller the angle of bevel 60 to the axis line) the greater the variation in dielectric field concentration across the flange area. In cases of relatively sharp bevels, relatively small amounts of softened plastic material will be moved radially inwardly to a position inside of proximal flange edges 52. In cases of bevel angles which are not as sharp, greater amounts of softened plastic material will be moved inwardly, and there will be more even softening of material across the flange. In such cases, movement of softened material in the outward direction may be impeded by a lack of space available to receive softened material in its lateral movement. The aforementioned double-beveled design alleviates this problem to some extent. All these factors must be considered in determining a specific electrode design.

Figure 9:
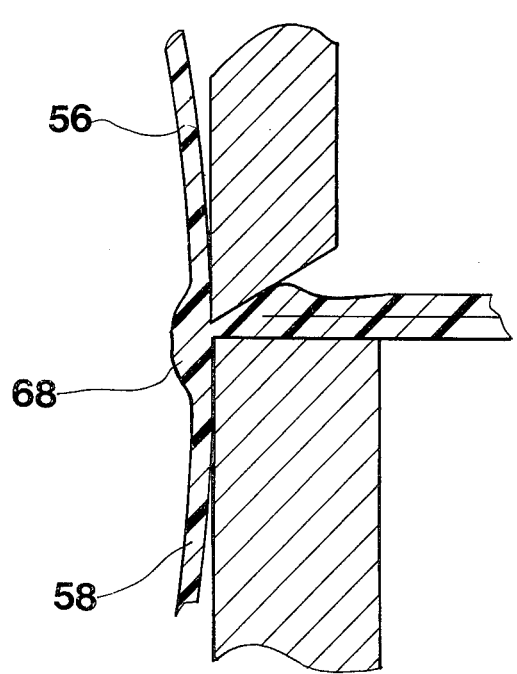

The dielectric field is turned off when movable electrode 32 reaches a certain point in its downward movement. This can be accomplished by tripping of a properly placed micro-switch (not shown). FIG. 9 illustrates the relative positions of electrodes 32 and 34 and the condition of subshells 56 and 58 at the moment the dielectric field is removed. Throughout the whole cycle except when the press is opened for removal and replacement of work pieces, movable electrode 32 continues to apply clamping pressure on the flange material. When the dielectric field is removed, there is a sufficient amount of intermingling softened material available to form a satisfactory weld between subshells 56 and 58.

Figure 10:
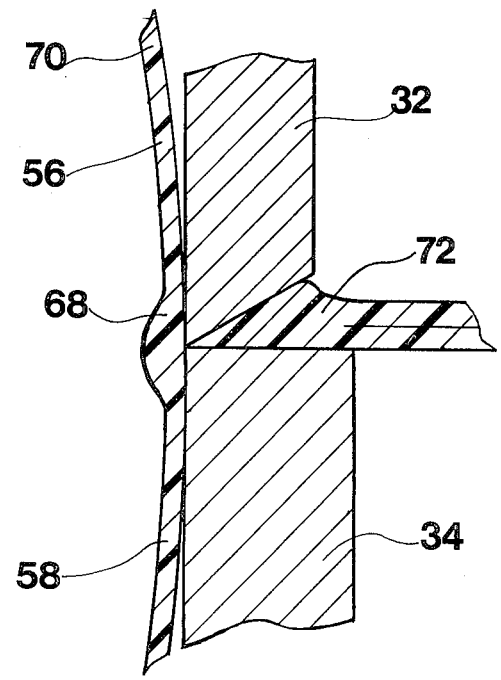

The continued application of clamping pressure by movable electrode 32 after the dielectric field is removed completes the formation of an internal bead 68, as shown best in FIG. 10. Internal bead 68 securely holds subshells 56 and 58 together, while being entirely hidden within the flangeless shell.

The severing of flangeless shell 70 from the waste flange material 72 is accomplished by the final clamping movement of electrode 32, applying cutting pressure after the dielectric field is removed. In some cases, cutting edge 44 will stop in contact with inner anvil edge 54. In other cases, however, cutting edge 44 will stop just short of anvil edge 54 and flangeless shell 70 will be broken away from the waste material in a subsequent step. Either action of cutting edge 44 is referred to herein as "cutting" or "severing."

The apparatus for applying clamping pressure to the flanges through the electrodes should be finely adjustable, providing acceptable initial clamping pressure which continues throughout most of the cycle, and, in some cases, an additional amount of clamping pressure to cut the flangeless shell from the waste material. Hydraulic, pneumatic or other mechanical clamping devices may be used, or a combination of devices may be used to provide initial and final clamping pressures.

Virtually any plastic material which may be RF welded can be used in making flangeless shells in accordance with this invention. Examples of suitable materials are polyvinyl chloride, acrylonitrite butadiene styrene, polyurethane (elastomeric), polyvinyl acetate, and saran. Other suitable materials are well known to those skilled in the art.

The flangeless shells made in accordance with this invention are preferably thin-walled shells, that is, shells having wall thicknesses of from about 0.005 to about 0.050 inches. Most preferably, wall thicknesses are from about 0.005 and 0.030 inches. Two subshells having different thicknesses can be welded together, although it is preferable that the subshell thicknesses be approximately equal.

In order to achieve high quality flangeless welds well-controlled and highly accurate presses should be used. The quality and appearance of the finished product will depend upon the alignment of the electrodes and the degree of parallelism between them. The press construction should insure parallel closing of the welding electrodes even when plastic parts are missing from a portion of the device. A precise leveling system should be incorporated in the welding press to achieve perfect or near perfect parallelism of the mounted welding electrodes.

The RF generator is preferably connected to the moving section of the press, but may be connected to the fixed section. Accurate and finely adjustable micro-switches should be mounted as required to allow activation and deactivation of the dielectric field at proper times and with appropriate spacings between electrodes 32 and 34. Exact timing of the dielectric field application and of the press movement will provide consistently good flangeless welds. A variety of well known timing devices may be used to control the actions of the subject equipment.

RF generators which are well known in the art may be used for this invention. Most industrial generators work in the frequency range of about 25-50 MHz. Use of the higher frequency ranges will usually give better results, and should be considered whenever industrial standards in the area of use allow such higher frequencies. As in any dielectric weld, the tendency to develop an arc at the electrode should be curbed. Arc suppressors or arc control units have proved successful in preventing arcs, which can damage expensive electrodes.

The electrodes are preferably made of tool steel hardened to 55 RC. When the dies are used both for welding and as thermoforming molds, they should be constructed of beryllium copper hardened to 40 RC and coated with die-nickel having a hardness of approximately 60 RC. Hardening and coating prevent premature wear of cutting edge 44 and anvil edge 54. Other electrode materials, such as aluminum or non-specialty steel, can be used successfully, but usually only for limited time periods such as in prototype work.

The base plates, such as movable platen 18 and fixed platen 22, must be extremely rigid and ground to close tolerances. They can be made of beryllium copper, steel, aluminum, or other suitable materials. Heat conductivity is of great importance as consistent temperatures insure consistent quality. A temperature control unit, which can circulate a mixture of water and oil as a cooling medium, is preferably used to keep the base plates at a constant temperature. Suitable control units are well known to those skilled in the art. Individual electrodes should be mounted accurately to insure perfect alignment with their facing electrodes. Separate electrode stations can be mounted closely together, taking advantage of the flangeless characteristic of the product of this invention.

While in the foregoing specification, this invention has been described in relation to certain preferred embodiments and many details have been set forth for purpose of illustration, it will be apparent to those skilled in the art that the invention is susceptible to additional embodiments and that certain of the details described herein can be varied considerably without departing from the basic principles of the invention.

I claim:

1. A method for welding together two substantially rigid thermoplastic subshells of the type having flanges with congruent proximal edges to form a flangeless thermoplastic shell, comprising:

applying clamping pressure to clamp the subshell flanges together between a pair of facing electrodes, the proximal edges of such flanges being aligned;

while continuing such clamping pressure, applying a dielectric field to the flanges, said field being most concentrated at the proximal edges, to soften and fuse said flanges together at or near the proximal edges, said continued clamping pressure producing further clamping movement whereby some softened flange material is displaced to form a bead inside the proximal edge location;

terminating application of the dielectric field; and thereafter continuing such clamping movement of said electrodes to substantially sever the flanges from the flangeless shell at said proximal edges.

2. The method of claim 1 wherein said pair of facing electrodes are relatively movable along an axial centerline and together define a shell-receiving hollowed space bounded by flange-engaging clamp areas, one of said electrodes being a cutting electrode the clamp area of which terminates radially inwardly in a cutting edge congruent to the proximal edges and the other of said electrodes being an anvil electrode the clamp area of which terminates radially inwardly in an inner anvil edge congruent to and axially aligned with the cutting edge, said clamp areas defining when together a void space radially outwardly of the cutting edge.

3. The method of claim 2 wherein the cutting electrode clamp area is beveled radially outwardly from the cutting edge such that axial spacing between the clamp areas of the electrodes increases as radial distance from the cutting edge increases.

4. The method of claim 3 wherein the beveled cutting electrode has a first bevel surface immediately adjacent to the cutting edge and therebeyond a second bevel surface which is beveled at a smaller angle to the axial centerline than is the first bevel surface.

5. The method of claim 3 wherein the anvil electrode has a clamp area which is substantially normal to the axial centerline.

6. The method of claim 5 wherein the beveled cutting electrode has a first bevel surface immediately adjacent to the cutting edge and therebeyond a second bevel surface which is beveled at a smaller angle to the axial centerline than is the first bevel surface.

* * * * *